Jan. 4, 1966    N. O. ROSAEN    3,227,179
CARTRIDGE VALVES

Filed May 28, 1964    2 Sheets-Sheet 1

INVENTOR.
NILS O. ROSAEN
BY
Hauk & Hauke
ATTORNEYS

United States Patent Office 3,227,179
Patented Jan. 4, 1966

3,227,179
CARTRIDGE VALVES
Nils O. Rosaen, 1776 E. Nine Mile Road,
Bloomfield Hills, Mich.
Filed May 28, 1964, Ser. No. 371,884
6 Claims. (Cl. 137—625.61)

This application is a continuation-in-part of my now abandoned Ser. No. 163,618, filed January 2, 1961.

The present invention relates to fluid systems, particularly to such systems employing one or more line valves to be controlled by remotely positioned pilot valves, and more particularly to such a system having one or more new cartridge type line valves utilizing inherent system pressures for selective operation of the valve and including automatically operable pressure relief means.

It is often convenient to utilize pilot valves as a means of actuating other valves disposed in the lines of a fluid circuit. In this manner a convenient control point may be established to operate main line valves which may be then located in widely scattered parts of the circuit. Line valves which would otherwise be difficult to reach for manual operation then may be regulated from this control point.

In those fluid systems in which the fluid used must be supplied alternately with fluid under pressure and then exhausted, a rather complex arrangement of pilot valves and line valves has been heretofore required. Further, in such systems in which it is necessary to insure that a desired pressure value will not be exceeded in the system, one or more separate pressure relief means has been heretofore necessary.

The present invention provides a simply constructed cartridge type line valve which utilizes inherent system pressures to both supply fluid to and exhaust fluid from a fluid user. A simply constructed pilot valve can be used to selectively operate the line valve of the present invention. Further, the cartridge type reverse flow line valve of the present invention incorporates a pressure relief means so that the pressure of the fluid delivered to the fluid user will not exceed a desired value.

An object then of the present invention is to improve fluid systems by providing a new cartridge type line valve utilizing inherent system pressures to selectively regulate fluid flow to and exhaust from a fluid user.

Still another object of the present invention is to improve fluid systems by providing a combination reverse flow and pressure relief line valve.

Still further objects and advantages of the present invention will readily occur to one skilled in the art to which the invention pertains upon reference to the following description and drawings in which like characters refere to like parts throughout the several views and in which FIG. 1 is a diagrammatic view of one preferred fluid system of the present invention including a longitudinal cross-sectional view of a preferred valve structure.

Figure 1:
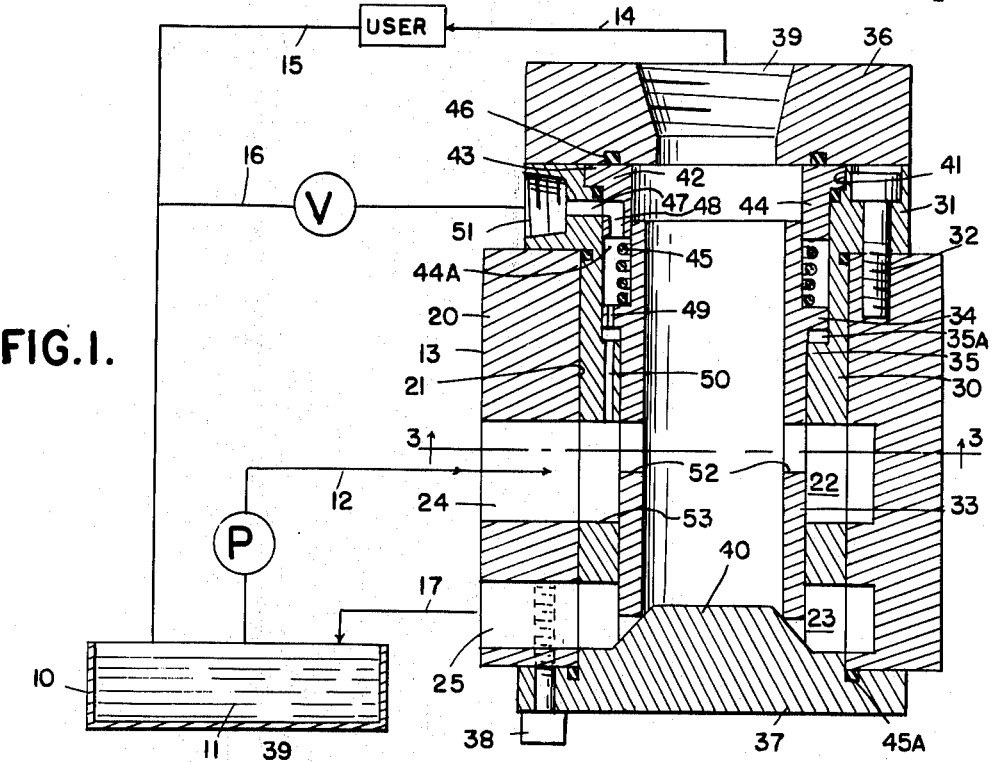

Now referring to the drawings, FIG. 1 shows diagrammatically one preferred fluid system of the present invention as comprising a reservoir 10 of any suitable type to store fluid 11. A pump P is normally operable to deliver fluid through a conduit 12, through a valve structure indicated generally at 13 and through a conduit 14 to a fluid user as indicated. Return conduit 15 carries the fluid back to the reservoir 10, thus completing the normal operating circuit.

A pilot valve denoted diagrammatically at V may be of the type known in the art, operable to variably open and close fluid flow through a relief conduit 16 connecting the valve structure 13 and the return conduit 15.

Figure 2:
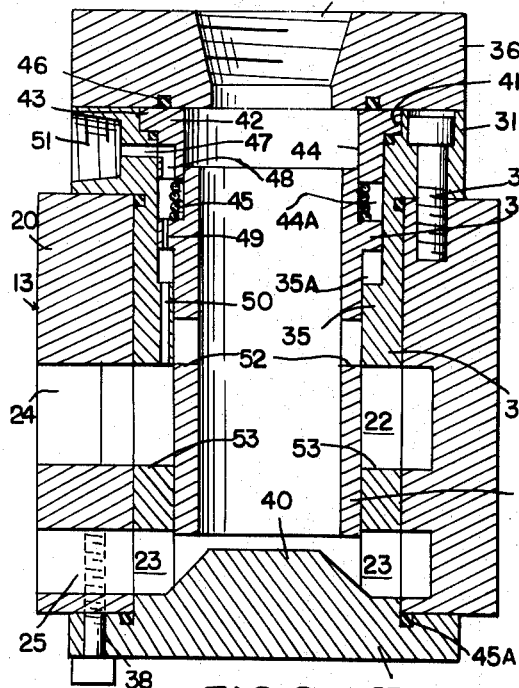
FIG. 2 is a view of the valve structure shown in FIG. 1 but showing it at a different stage of operation.
Figure 3:
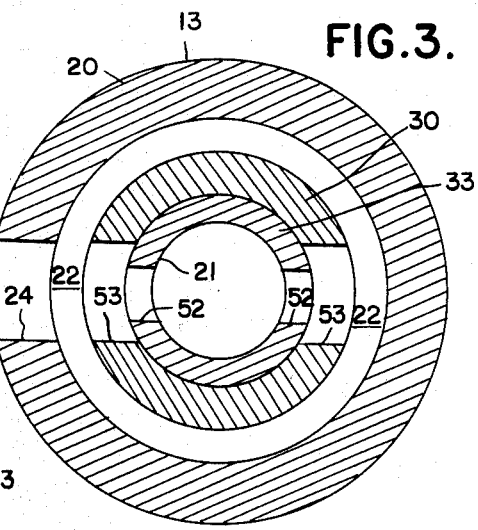
FIG. 3 is a transverse cross-sectional view of the preferred valve structure taken substantially at line 3—3 of FIG. 1.

As illustrated in FIGS. 1-3, the valve structure 13 preferably comprises a housing 20 provided with a longitudinal bore 21. The bore 21 forms the axis for an annular chamber 22 and an annular recess 23 provided in the housing 20. The recess 23 is provided at one end of the housing 20 and the chamber 22 is spaced axially inwardly therefrom. An inlet port 24 adapted to be connected to the conduit 12 is provided in the housing 20 and registers with the annular chamber 22. An outlet port 25 registers with the recess 23 and is adapted for connection to a conduit 17 which returns to the reservoir 10.

A sleeve member 30 is disposed in the bore 21 and is provided with a radially outwardly extending flanged portion 31 adjacent one end thereof and a radially inwardly extending flanged portion 35 axially inwardly spaced from the flanged portion 31. The sleeve member 30 may be secured to the housing by any convenient means such as bolts or screws 12 extending through the flanged portion 31. A hollow piston 23 is axially slidably carried in the sleeve member 30 and is provided with a radially outwardly extending annular flange 34 disposed adjacent and slightly above the flanged portion 35 of the sleeve member 30 to define a narrow annular chamber 35A between the flange 34 and the flanged portion 35.

A cap member 36 is secured to the flanged portion 31 of the sleeve 30 by any convenient means such as screws or bolts (not shown) to close the upper end of the housing 20. An end plate 37 is secured to the opposite end of the housing 20 by any means such as screws or bolts 38 and is provided with a frusto-conical boss portion 40 extending axially into the bore 21. In the position illustrated in FIG. 1, the lower edge of the hollow piston 33 seats against the boss portion 40 to close communication between the interior of the piston 33 and the recess 23. O-ring seals 45A and 46 may be inserted into concentric grooves fashioned respectively in the plate 37 and the cap 36 to prevent fluid leakage during the operation of the valve. A port 39 is provided in the cap 36 and is open to the interior of the piston 33. The port 39 is adapted for the connection with the conduit 14.

An annular groove 41 is provided at the capped end of the sleeve member 30. A ring structure 42 positioned as shown comprises an axially extending base portion 44 and a radially outwardly extending annular flange portion 43. The flange portion 43 is carried in the annular groove 41 and the ring structure 42 and the flange 34 of the piston 33 are suitably based to provide an annular cavity 44A between the free end of the base portion 44 and the upper surface of the flange 34. The free end of the base portion 44 forms the seat for a spring 45 engaging the upper surface of the flange 34 to bias the piston 33 downwardly in the sleeve member 30 against the boss portion 40 of the end plate 37. The flanged portion 31 of the sleeve member 30 is provided with a control outlet 51 adapted to be connected to the pilot valve V by the conduit 16. Passages 47 and 48 formed in the sleeve member 30 and the ring structure 42 respectively provide communication between the outlet 51 and the cavity 44A. A restricted orifice 49 is provided through the flange 34 to connect the annular cavity 44A with the chamber 35A. A passage 50 extends through the flange portion 35 of the sleeve member 30 to provide communication between the chamber 35A and the chamber 22. It is apparent then that fluid under pressure is at all times supplied to the control outlet 51 from the inlet 24.

The sleeve member 30 is provided with annularly spaced radially extending passages 53 which register with the chamber 22 as can best be seen in FIG. 3. The piston 33 is provided with through ports 52 which communicate with the passages 53 when the piston 33 is in the axial position indicated in FIG. 1.

When it is desired to supply pressurized fluid through the conduit 14 to the fluid user, the pilot valve V is regulated to a completely closed position. Pressurized fluid will be delivered by the pump P through the conduit 12 to the chamber 22 of the valve 13. The passage 50 transmits the pressure produced by the pump P from the chamber 22 to the cavity 35A beneath the flange 34. With the pilot valve V closed and assuming a constant pump pressure, the pressure on each side of the flange 34 will be substantially equal because of the communication across the flange 34 afforded by the passage 49. The spring 45 will then urge the piston 33 to the axial position illustrated in FIG. 1. In this axial position of the piston 33, the ports 52 register with the chamber 22, and the lower edge of the piston 33 engages the boss portion 40 to close communication between the interior of the piston 33 and the outlet port 25. Thus a pressurized fluid will be delivered by the pump P through the interior of the piston 33 out the port 39 and to the fluid user by conduit 14.

When it is desired to exhaust the fluid user through the valve 13, the pilot valve V is regulated from the closed position to an open position to open the conduit 16 and port 51 to the lower pressure on the return side of the system. The pressure is thus relieved from cavity 44A to produce a pressure differential across flange 34 which will move the piston axially against the force of the spring 45. The passage 49 is of a smaller cross-sectional area than the passages 50 and 48, so that the amount of fluid relieved by the pilot valve V will not be as great as the volume of fluid passing through the passage 50 to the cavity 35A. This maintains a pressure differential across the flange 34 any time the pilot valve V is opened which is sufficiently high to retain the piston 33 in an upward axial position as shown in FIG. 2.

With the piston 33 in its upward axial position as shown in FIG. 2, the ports 52 no longer register with the ports 53 so that fluid flow is closed from the pump P to the interior of the piston 33. As the piston 33 is moving toward the position shown in FIG. 2, the lower edge of the piston 33 moves away from the boss portion 40 to open the outlet 25 to the interior of the piston so that a reverse flow fluid path is opened between the port 39 and the outlet 25, thus exhausting the fluid user.

By regulating the pilot valve V between a fully open position and a fully closed one, the pressure differential across the flange 35 may be regulated so that the piston 33 can be selectively positioned within the sleeve member 30. In this manner the amount of fluid flowing to the user as well as its pressure may be regulated. It is apparent that the movement of piston 33 corresponds directly to the degree of opening of pilot valve V. In effect then, the fluid flow as well as the pressure of the fluid delivered to the user will vary inversely with the fluid flow through outlet 51.

It is to be noted that the valve 13 of the present invention also acts as a pressure relief valve. If the pressure of the fluid delivered through the conduit 12 exceeds a predetermined value, the increased pressure will be transmitted through the passage 50 to the cavity 35A to cause the piston member to move upwardly against the spring 45, and to open the interior of the piston 33 to the reservoir 10 through outlet 25. Although the pressures across flange 35 will eventually equalize the difference in cross sectional areas of the passages 50 and 49 will delay equalization for a period of time sufficient to relieve the excess pressures. It is to be further noted that the valve 13 of the present invention is of an open center construction. This means that as the piston 33 is moving intermediate the positions illustrated in FIGS. 1 and 2, the relief outlet 25 remains open to the interior of the piston 33 so that excessive pressure can not be built up in the system during operation of the valve 13.

Figure 4:
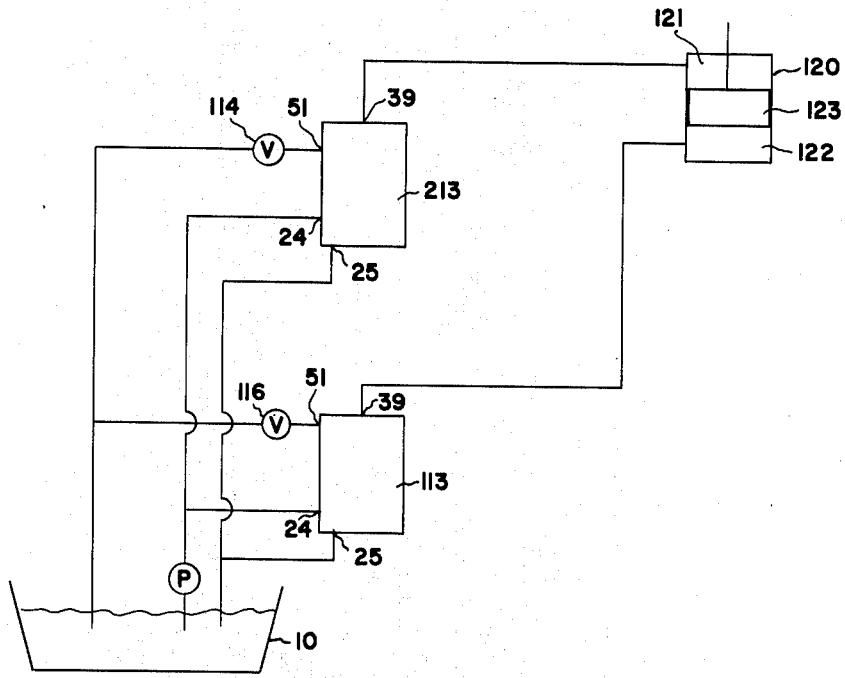
FIG. 4 is a diagrammatic view of another preferred fluid system of the present invention.

FIG. 4 illustrates diagrammatically another preferred fluid system of the present invention. This system is intended to operate a fluid user 120 of the type requiring alternate pressurizing and exhausting of separated chambers 121 and 122 such as would be necessary for example to produce movement of a piston 123.

In such a system two valves like those described above would be required. These valves have been indicated by reference characters 113 and 213 but it is to be understood that each of the valves is like the valve 13 described above and the reference characters have been changed to avoid confusion during the description of the operation of this system.

The port 39 of the valve 213 is connected to the chamber 121. The control outlet 51 is connected through pilot valve 114 to reservoir 10. The inlet 24 is connected through pump P to the reservoir 10 and the outlet 25 is connected by a return conduit to the reservoir 10.

The port 39 of the valve 113 is connected to the chamber 122 of fluid user 120. The outlet 51 is connected through pilot valve 116 to the reservoir 10. The inlet 24 is connected through the pump P to the reservoir 10 and the outlet 25 is connected by a return line to the reservoir 10.

In operation with the pilot valve 114 closed and the pilot valve 116 open, fluid under pressure will be supplied to the chamber 121 of the fluid user 123 through the port 39 of the valve 213 in the manner described above. Since the pilot valve 116 is opened, the inlet 24 of valve 113 will be closed as described above and a reverse flow fluid path will be open between the port 39 and the outlet 25 of the valve 113 so that fluid will be exhausted from the chamber 122 of the fluid user 120 which together with the pressurized fluid entering chamber 121, produces a downward axial movement of the piston 123.

When it is desired to move the piston 123 upwardly, the pilot valve 114 will be opened to produce an exhausting of chamber 121 and the pilot valve 116 will be closed to provide fluid under pressure to the chamber 122.

It is apparent that a cartridge type reverse flow line valve has been described which can be used in a number of different types of fluid systems. The valve requires no extra pressure producing means for its operation but utilizes the inherent pressures of the system to produce the desired valving action. Further, the particular control means provides a valve in which excessive pressures in the system are automatically and immediately relieved. Thus, a separate pressure relief valve is not required in the system.

It is further apparent that although the cartridge type reverse flow line valve of the present invention has been described with reference to several fluid systems, it is capable of being used in many other fluid circuits and for many other purposes and that further modifications and changes can be made in the described preferred embodiment of the present invention without departing from the spirit of the invention as expressed by the scope of the appended claims.

I claim:
1. A fluid valve comprising
 (a) a housing having an inlet adapted for connection to a source of fluid under pressure, a port adapted for connection to a fluid user, and an outlet adapted for connection to a fluid reservoir,
 (b) a hollow piston axially slidably carried in said housing, said port registering with the interior of said hollow piston, and said piston having means opening fluid flow from said inlet through the interior of said hollow piston to said port and closing fluid flow through said outlet at a first operating position of said piston and closing fluid flow from said inlet to the interior of said piston and opening fluid flow from the interior of said piston to said outlet at a second operating position of said piston whereby in said first operating position of said piston fluid under pressure is directed through said inlet and through the interior of said hollow piston to said port and at said second operating position of said piston pressure is relieved from said fluid user through said port through said hollow piston and through said outlet, (c) spring means urging said piston toward said first operating position, (d) a control outlet provided in said housing and means providing communication at all times between said control outlet and said inlet, (e) means selectively varying fluid flow through said control outlet, (f) said piston having a flange portion disposed intermediate said inlet and said control outlet and said communication providing means comprising a first passage provided in aid housing and a second passage provided in said flange portion, said passages having different cross sectional areas with the cross sectional area of said first passage being larger than the cross sectional area of said second passage, said passages being connected in series and being positioned with respect to said flange to produce a pressure differential across said flange upon the flow through said control outlet being varied to urge said piston against said spring means and toward said second operating position of said piston.

2. A fluid valve comprising (a) a housing having an inlet adapted for connection to a source of fluid under pressure, a port, and an outlet, (b) a piston axially slidably carried in said housing and having means opening fluid flow from said inlet to said port and closing fluid flow from said inlet to said outlet in a first axial position of said piston and closing fluid flow from said inlet to said port and opening fluid flow from said port to said outlet at a second axial position of said piston, (c) means resiliently urging said piston toward said first axial position, (d) a control outlet provided in said housing and means providing communication at all times between said control outlet and said inlet, (e) valve means selectively operable to close and to variably open fluid flow through said control outlet, and (f) means operable upon said valve means being variably opened to urge said piston toward said second axial position.

3. In a valve, (a) a housing provided with an inlet, an outlet, and a fluid port, (b) said housing being provided with an axially extending bore, (c) a piston axially slidably carried in said bore and being provided with means opening communication between said inlet and said port at a first operating position thereof and closing communication between said inlet and said port and opening communication between said port and said outlet at a second operating position thereof, (d) a spring carried in said housing and urging said piston axially toward said first operating position, (e) a control outlet provided in said housing and at least two passages connecting said control outlet with said inlet, (f) said control outlet being adapted for connection with a pilot valve operable to selectively vary the flow through said control outlet, (g) said passage being connected in series and having different cross sectional areas with the cross-sectional area of the upstream of said passages being greater in cross sectional area than the downstream of said passages whereby to create a pressure differential intermediate said passages which varies depending upon the amount of fluid flow allowed through said control outlet, and (h) means transmitting said pressure differential to said piston to urge axial movement of said piston upon an increase in said pressure differential against said spring and in a direction toward said second operating position of said piston.

4. A fluid valve comprising (a) a housing provided with a bore, (b) a piston slidable in said bore and control means for selectively positioning said piston in said bore, (c) said housing having a pressure inlet adapted to be connected with a fluid pressure source, a port adapted for connection to a fluid user, and a pressure relief outlet, (d) said piston having means operable to close said pressure relief outlet and open flow between said inlet and said port at a first axial position thereof and to close fluid flow from said inlet to said port and to open said pressure relief port at a second axial position thereof, (e) said control means comprising a control outlet in said housing communicating with said inlet and adapted to be connected to a pilot valve operable to selectively variably open and close fluid flow through said control outlet, (f) means responding to an increase in the fluid flow through said control outlet to actuate said piston toward said second axial position, and (g) means responding to a predetermined increase in the pressure at said inlet to actuate said piston toward said second axial position.

5. The valve as defined in claim 4 and in which said piston is provided with a substantially annular flange, (a) said actuating means comprising a pair of fluid passages connected in series intermediate said inlet and said control outlet, (b) one of said passages being provided in said flange and said passages each having a different cross sectional area, with the passage being provided in said flange being of a smaller cross sectional area than the other of said passages whereby upon an increase in the fluid flow from said control outlet or an increase in the pressure at said inlet a pressure differential is produced across said flange to move said piston axially in said bore.

6. The valve as defined in claim 5 and including means acting upon said flange to urge said piston axially in opposition to the movement produced upon an increase in the pressure differential across said flange.

References Cited by the Examiner

UNITED STATES PATENTS

| | | | |
|---|---|---|---|
| 1,092,984 | 4/1914 | Ewalt | 137—625.49 |
| 1,958,010 | 5/1934 | Meurk | 251—41 X |
| 2,251,618 | 8/1941 | Rogers et al. | 137—487 |
| 2,401,144 | 5/1946 | Dube | 251—43 X |
| 2,729,242 | 1/1956 | Olson | 137—625.63 |
| 2,854,995 | 10/1958 | Lornitzo | 137—508 X |
| 3,074,433 | 1/1963 | Stark | 137—625.26 X |

M. CARY NELSON, *Primary Examiner.*

MARTIN P. SCHWADRON, *Examiner.*